United States Patent [19]

Gallizia

[11] 4,166,832

[45] Sep. 4, 1979

[54] PROCESS FOR THE INJECTION MOLDING OF MOTOR VEHICLE TIRE TREADS

[75] Inventor: Achille Gallizia, Milan, Italy

[73] Assignee: Industrie Pirelli, S.p.A., Milan, Italy

[21] Appl. No.: 860,304

[22] Filed: Dec. 14, 1977

[30] Foreign Application Priority Data

Dec. 30, 1976 [IT] Italy ............................... 30985 A/76

[51] Int. Cl.² .......................... B29D 3/02; B29H 3/08
[52] U.S. Cl. ...................................... 264/279; 264/36; 264/328
[58] Field of Search ................ 264/36, 279, 315, 326, 264/328, 329; 156/125; 425/567, 570

[56] References Cited

U.S. PATENT DOCUMENTS

| | | | |
|---|---|---|---|
| 2,569,935 | 10/1951 | Leguillon et al. ............... | 264/328 X |
| 2,724,425 | 11/1955 | Ostling ............................ | 264/328 X |
| 2,744,290 | 5/1956 | Corson ............................. | 264/326 X |
| 2,873,790 | 2/1959 | Cadwell et al. ................. | 264/328 X |
| 4,055,619 | 10/1977 | Goodfellow ..................... | 264/328 X |

Primary Examiner—Jan H. Silbaugh
Attorney, Agent, or Firm—Stevens, Davis, Miller & Mosher

[57] ABSTRACT

The invention provides a process for the injection molding of treads on a tire carcass which comprises feeding an elastomeric composition for molding the tire's tread to a plurality of equalization spaces symmetrically arranged with respect to the injection cavity of the mold where the tread is formed, the mix moving to the injection cavity from each of the spaces through a plurality of injection passages, the mix being fed to each of the spaces through at least one feeding passage and the ratio between average sliding gradients $\gamma_i$ of the injection passages and gradients $\gamma_a$ of the feeding passages being not lower than 8. The invention also provides an apparatus for the injection molding of a tread on a tire body having a plurality of feeding channels symmetrically arranged around the injection cavity, a plurality of equalization chambers arranged with the same symmetry and into which the feeding channels flow, and a plurality of injection orifices which connect each chamber with the cavity, the ratio between the sections of the injection orifices and the section of the feeding channels and the number of injection orifices where the delivery of each feeding channel spreads, being such that, when a fluid mix for molding the tread is flowing through them, the ratio between respective gradients $\gamma$ of average sliding is now lower than 8.

10 Claims, 5 Drawing Figures

PROCESS FOR THE INJECTION MOLDING OF MOTOR VEHICLE TIRE TREADS

The present invention relates to a process and an apparatus for the injection molding of motor vehicle tire treads on the tire carcass (which on the other hand can also be applied to other bodies made of elastomeric material with similar toroidal or annular form).

The invention can be applied to either the manufacture of new tires or the retreading of worn tires.

It is well known in the art that, by means of any suitable process, the tire body is first fabricated. The tire body is the carcass covered with a layr of mix or more accurately, the unit comprising the tire sidewalls and the "undertread" which comprises either the stiffening structure or that part of the stiffening structure that will form the structural part of the tread itself, which is usually of textile nature.

On this part of the body and its stiffening structure, the real tread is formed from a suitable elastomeric mix, which is normally different from that used for the sidewalls, and which is provided with projections and depressions varying according to the tread design. The tread can be formed by different processes, but this invention relates to its formation by injection molding, which has been proposed before but has found no industrial application so far, owing to the remarkable technical difficulties connected with its execution.

The formation of the tread is necessary either for the manufacture of new tires or for the socalled retreading of used tires. In the first case, the tire body has been formed in a first phase of the tire manufacture and therefore it can be said to be "fresh". The rubber mix that covers the stiffening fabric on a face and partly impregnates it, can be in the raw or partly cured state. There are processes where the body and the tread are manufactured at practically the same time. On the contrary, when a worn tire must be retread, the remaining parts of the worn out tread are removed, the stiffening structure is laid practically bare and the resulting structure is similar to the one that would be obtained in the manufacture of a new tire but it has already undergone all the curing phases and therefore the mix that covers or impregnates the stiffening fabric is wholly cured. The problems concerning the manufacture of the tread are similar in both cases or only differ with regard to quantity, and therefore both cases are included in the present invention.

For those reasons and because the formation of the body containing the stiffening fabric is not part of this invention and can be carried out by anyone of the well-known processes, the following description will only deal with the manufacture of the tread supposing that the remaining part of the tire that the tread is to be connected to is manufactured by any well-known techniques and either is, depending upon the particular case, of new and also ideally contemporaneous manufacture or belongs to a worn out tire.

A technique for the injection molding of the tread is described in French Pat. No. 1,508,135. In one of the variants disclosed in the patent, first of all a tire body is manufactured by injecting some injectable rubber mix around the carcass of the tire in order to complete the sidewalls and form an undertread. A core or male mold has been introduced inside the carcass beforehand. The tire body is then introduced with the core into an outer mold or female mold of the desired form in order to be able to inject the tread in the position required. The injection of the tread mix into the cavity of the mold takes place through a single inlet opening, with the mix being led so as to branch out into two streams in two opposite directions thus filling up the whole cavity of the mold. In copending patent application Ser. No. 596,409 filed July 16, 1975, now U.S. Pat. No. 4,088,523, an injection molding process is described for forming the tread by injecting a mix through an opening which is connected with one or more annular or substantially annular openings through which the mix goes into the cavity of the mold.

In copending application Ser. No. 768,872 filed Feb. 15, 1977, there is described a tread molding process where the mix is injected into the cavity of the mold through a plurality of injection openings arranged in an equatorial plane in such conditions as to determine a mix flow within the cavity of the mold according to flow lines and by making subsequent fronts and pressure zones such as to guarantee the molding of a tread showing in all the points the required characteristics of geometrical and physical symmetry and evenness that must be very strict in that type of manufactures, as is well-known.

An object of this invention is to provide a process and apparatus for injection molding tire treads for motor vehicles or similar bodies, which produces the highest and best characteristics in the tire, thus fully solving the problems of injection molding tire treads. This invention can be used to good advantage together with the inventions described in the above-identified patent applications, but it can also be used separately, thus achieving a remarkable progress with respect to the well-known state of the art.

In accordance with this invention, the mix to be molded into the tread is fed to a plurality of spaces which are symmetrically arranged with respect to the axis of the mold cavity where the tread is to be molded and which will be called "spaces" or "equalization chambers". From each space the mix goes through a plurality of injection passages to the injection cavity, the feeding of the mix to each equalization chamber being carried out through at least one feed passage; the various injection passages having gradients of average sliding which are indicated with symbol "$\gamma$", hereinafter called "gradients $\gamma$", rather near and preferably substantially equal the ratio between gradients $\gamma$ of the injection passages and gradients $\gamma$ of the feeding passages being not lower than 8 and preferably between 8 and 20. Gradient $\gamma$ is a well-known quantity in the rheological technique.

For a general discussion about gradient, see S. J. Kundsen and D. Katz, "Fluid Dynamics and Heat Transfer" (Mcgraw-Hill, New York, 1958), page 97, and an article by P. Lahti in J. Plastics Eng. 19,619 (1963). It is generally defined by the formula:

$$\gamma = c(Q/A_2) \cdot p$$

where Q is the delivery through a section of the pipeline that is considered, in the conditions and for the fluid that is considered. A is the area of the cross-section of the pipeline, P is the perimeter of the said cross-section, and c is a coefficient of the form.

It can be seen that the gradient is proportional to the average speed of flow of the material flowing into the pipeline and to the ratio between the perimeter and the section of the pipeline.

Gradient γ has the sizes of the opposite of a time, $t^{-1}$, and is therefore expressed in sec $^{-1}$. The average speed can be practically drawn as the ratio between the delivery and the section of the pipeline.

When carrying out the invention it is suitable, but not necessary, that the various passages be circular. With regard to circular pipelines the coefficient of form c has a value equal to 2.

With regard to pipelines which are not circular, that coefficient is higher than 2 and namely:

| | |
|---|---|
| octagonal section | 2,0056 |
| square section | 2,0141 |
| equilater triangle section | 2,1384 |
| semicircular section | 2,144 |
| right-angled section (1:2 ratio between the legs) | 2,9378 |
| right-angled section (1:10 ratio between the legs) | 5,1864 |

With regard to other sections, coefficients c can be calculated according to the mathematic treatment included in the above-mentioned literature.

With regard to the invention, since gradients γ are not so important as their ratios, when pipelines of similar sections are in question (in geometrical sense, i.e. different with regard to the scale only) it is not even necessary to know the coefficients of form, which are the same for all of them.

When carrying out the invention, it is not essential that the passages are circular, although it is convenient in practice.

The critical conditions of the invention are therefore defined depending on gradients γ of the feeding passages and injection passages, which, in order to be clearer, will be indicated as gradients $\gamma_a$ and $\gamma_i$ respectively. It is however clear that each feeding passage will have a feeding pipeline through which the fluid mix will go to each equalization chamber from the apparatus that produces such a mix, which is not described here since it is not connected with the invention and can consist of well-known conventional apparatus used in the production of fluid mix. Along such a pipeline gradient γ can vary. In general it would be better that it is sensitively constant, save some zones where there will be even remarkable changes in relation to necks, changes of run and more, but whose length is rather small as to have no sensible influence on the process.

Preferably, the equalization chambers have an axis trend consisting essentially of an arc of a circle and, as already said, are symmetrically arranged around the cavity of the mold that is used to mold the tread.

In general, and preferably, the chambers have a circular section but they can also have a different section. Of course they have no constant gradient because, as injection passages are reached in the direction of the mix flow, a part of the mix is tapped and the delivery decreases, whereas on the other side it would not be very advantageous to change the section of the chamber correspondently.

According to the invention it would be better that gradient γ is higher than gradient $\gamma_a$ of the corresponding feeding passage in no point of the chambers of equalization. In general such a coefficient will be lower in every point of the chamber, as is easy to understand, if it is assumed that the equalization chamber is of a circular section and, as is generally convenient, of a section practically equal to that of the feeding passage. In such a case in the sections just next to the outlet of the said passage and at the two sides of it, the delivery will be one-half of that in the feeding passage and, the sections being equal, gradient γ will be one-half of $\gamma_a$ and will progressively decrease every time an injection passage is reached and overtaken.

According to the invention, in connection with means for the production of the fluid mix fit for all the injection molding of the tread and for the introduction of the mix to the zone of the mold and in connection with a mold where the injection cavity for the molding of the tread is defined, the apparatus involves a plurality of feeding channels, which are symmetrically arranged around the said injection cavity, a plurality of chambers, which are preferably substantially annular and arranged with the same symmetry, into which the feeding channels flow, as well as a plurality of channels or injection orifices which connect each chamber of equalization with the said cavity of the mold. Of course the specific structure of the mold can change from tread to trend design and in particular whether a new tire is to be molded or a worn tire is to be retreaded, and also according to the particular molding techniques that are used and are not part of the invention.

For each injection apparatus, the number of chambers of equalization and their circumference extents, the number of channels or injection orifices each chamber and the dimensions of the various parts, in particular the sections of the feeding and injection channels, should be so determined that gradients γ of the channels or injection orifices are rather near and preferably substantially equal and therefore can be indicated with the same symbol $\gamma_i$, which could represent an average value, and that the ratio between them and gradient $\gamma_a$ of the feeding channel, at least near the chamber of equalization, is not lower than 8 and preferably between 8 and 20.

The diameters of the passages or injection orifices are substantially equal to one another, and their number for each equalization chamber is correspondently limited so that no remarkable differences show in respective gradients γ diameters being equal. In most practical cases this is carried out through a number of injection orifices each equalization chamber going from 4 to 6. A lower number of such orifices could lead to a complication of the apparatus which is not to be desired from either the functional or structural point of view.

A higher number, at least with the mixes mostly in use for of tire treads, would lead to remarkable differences in gradients γ of the injection orifices, since the differences between the runs that the mix should follow from the feeding channels to the various injection orifices and the corresponding differences of load losses would have a sensible influence. Anyhow, the exact number of injection orifices allowed for each equalization chamber, in each specific case of injection, can be easily determined through simple empirical controls, being easy to control various gradient γ in conditions corresponding to those in which the injection molding of the tread must take place. It is to be recognized that changes of gradient γ from orifice to orifice can be compensated for by changing the diameters of the orifices one compared with the other, if it does not involve any excessive difficulties and if it is desired to increase the number of injection orifices for each equalization chamber in that way.

As an example, and only in the most common cases of tread molding with the mixes mostly used for this purpose, gradient $\gamma_a$ of the passages or feeding channels can have values between 150 and 250 sec$^{-1}$, whereas gradient $\gamma_i$ of the passages or injection orifices can have values between 1500 and 2500 sec$^{-1}$.

In this case ratio $\gamma_i/\gamma_a$ is generally about 10, if the two values are suitably coordinated. The above values can be used in many common cases and can however be a starting point for determining the optimum values concerning different cases.

As stated above, the technique for producing the injection mix is a well-known one and involves the use of a main source of mix consisting of means which turn the mix into a fluid state, considering the heat that generates in the flow of the mix through narrow channels and orifices and means suitable for putting the fluidized mix under pressure. The above means, as well as the canals that conduct the fluidized mix near the mold are not part of this invention and therefore will not be described.

As explanation only, it can be pointed out that, if gradient $\gamma_a$ is according to the above values, it is possible to have gradients either higher or lower than $\gamma_a$, and for instance variable between 15 and 400 in localized points of the canals. On the other hand those are practical data from experience, depending on construction reasons.

It is also pointed out that, since no processes nor apparatus are known in the art which allow tires to be retreaded through injection molding with the required characteristics necessary in an industrial work, as well as no apparatus suitable for this purpose, the tires that are retreaded with tread molded by injection according to the invention, can be considered new industrial products and therefore within the limits of this invention.

The invention will be better understood from the following examples which describe its execution, with reference to the enclosed drawings where:

FIG. 1 schematically illustrates a device according to the invention for the injection molding of the tread on a preformed body of a tire (in the manufacture of a new tire or in the retreading of a worn tire), showing a fragmentary section taken in a meridian plane of the mold, i.e. in a symmetry plane of the mold which goes through its own axis, illustrating a peripheral part of the mold, as will be better explained.

Figure 1:
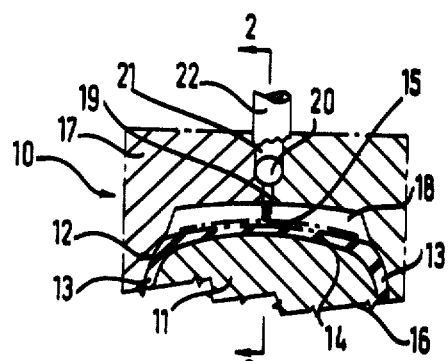

With reference to FIG. 1 the mold, generally indicated as 10, consists of a core 11, which supports the body of tire 12 (which may have contributed to its molding of the body in a previous operation), and this body consists of two sidewalls 13 and a part 14 which forms the undertread and comprises the stiffening structure of the tread (schematically indicated with 15) and a rubber layer below connected with the sidewalls. Number 17 indicates the female part of the mold, where the cavities and orifices that concern this invention and that can be better seen in the following figures are made out.

In FIG. 1 the body of the tire is indicated as already molded.

Since, for the purpose of this example, it is all the same whether it is a new tire or a retread one, the part of the mold has been left out that would be different in one case with respect to the other, whether it comprises means for molding the said body or not.

Therefore, the figure is not only limited to one of the two sides of the mold that would symmetrically appear in the same meridian section, but also, with regard to the illustrated side, it is interrupted at the broken line indicated with 16, i.e. the part that is more in the center is left out and therefore the parts of core 11 and of the female of the mold that circumscribe such parts are not illustrated as well as all the elements and devices placed nearer the axis of the mold than line 16. In the above example of the invention the mix goes into cavity 18 of the mold, where the tread is to be molded, through a plurality of passages or injection orifices 19 arranged along the equatorial plane of the mold, i.e. the symmetry plane of the mold perpendicular to its own axis, through arcuate equalization chambers 20 with substantially circular section, each one fed by a passage or feeding channel 21 to which the mix is coming from a pipeline 22. Those chambers can be considered as geometrical figures, which are generated by a circle (or another plane figure, if they were not with circular section), which moves, for a certain angular distance, along a directrix which is preferably an arc of a circle having the intersection of the axis of the mold with its equatorial plane as center.

Figure 2:
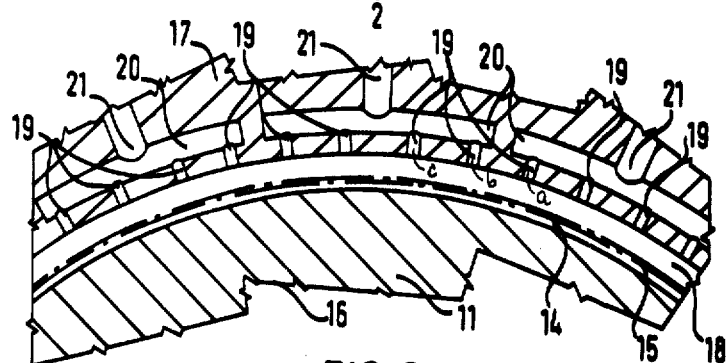
FIG. 2 illustrates the device of FIG. 1 in fragmentary radial section taken on the plane indicated with 2—2 in FIG. 1, perpendicular to the axis of the mold.
Figure 3:
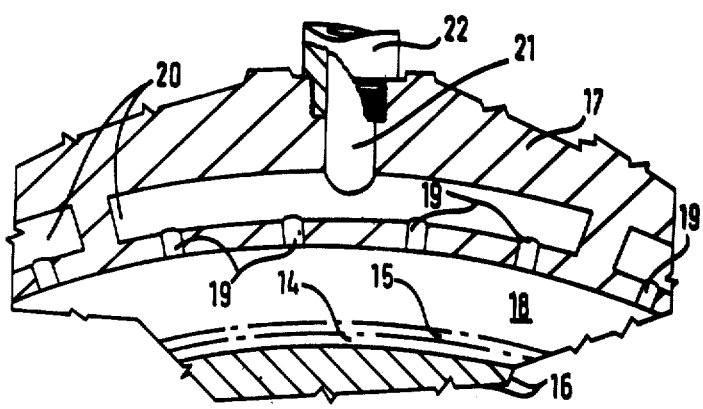
FIG. 3 is an enlarged scale detail of FIG. 2 and illustrates more clearly an equalization chamber and the feeding and injection passages joined.

Those parts can be better seen in FIGS. 2 and 3. In the illustrated example—s. FIG. 2—the axes of feeding channels 21 and therefore of chambers of equalization 20, are at the angular distance of 22°30', i.e. are 16 in all (only three of them are shown in FIG. 2) and the passages or injection orifices are 4 each chamber and therefore 64 in all. Those numbers are however illustrative and could be different. Furthermore, instead of feeding and injection passages all arranged on the equatorial plane, there could be more rows arranged partly or completely out of it. As already pointed out, there could be more than one feeding channel per chamber 20. The production means of the fluidized mix and its conduction to feeding passages 21 by means of pipelines 22, are not described and can be conventional.

Figure 4:
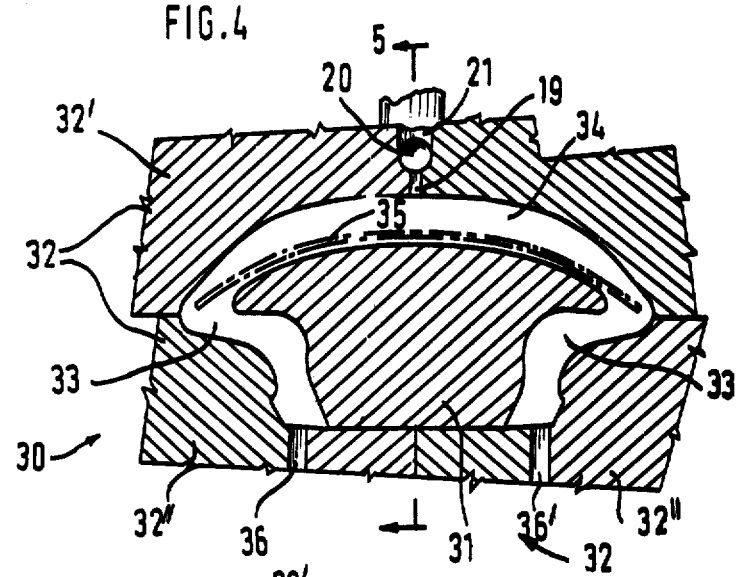
FIGS. 4 and 5 are fragmentary views which illustrate another example of the invention, in section in a meridian plane of the mold and in section in plane 5—5 of FIG. 4, respectively.
Figure 5:
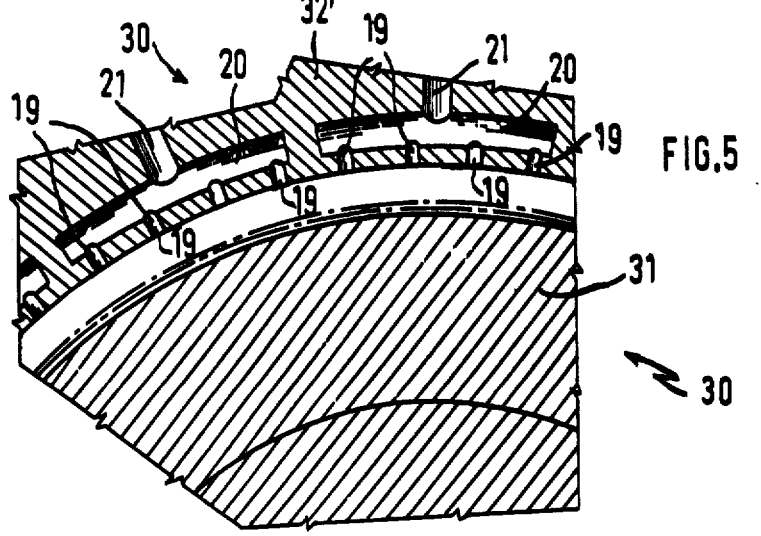

The example illustrated in FIGS. 4 and 5 differ from the previous one since it is assumed that the whole tire is molded in one phase or in very near phases, and therefore mold 30 comprises a core 31 and a female part indicated with 32 on the whole but divided into parts 32'-32", which make two cavities 33 for the sidewalls and a cavity 34 for the tread, whose stiffening structure 35 practically forms the separation between hollows 33 and 34. The molding mix of the sidewalls is conducted to cavities 33 by means of pipelines 36 - 36', to which it comes through means which do not concern this invention. This second example of execution particularly refers, as already said, to the manufacture of tires of the type described in U.S. Pat. No. 3,805,868. With regard to those tires as well, the invention is applied to either their manufacture or their retreading. With regard to the chambers of equalization and the passages herewith connected, FIGS. 2 and 3 are representative of the second example of execution as well. In any case the diameter of the chambers, which are with substantially circular section in the examples, was assumed equal to that of the feeding passages. This is not absolutely necessary, but in case of a difference of diameter, it would be better than the diameter of the chambers (or the equivalent diameter if they are not circular) is longer than the diameter (or the equivalent diameter) of the feeding passages. In any case, the center distance of the injection orifices must be constant on the whole development of the mold, and namely there must be such arrangement that the extreme adjacent orifices of two adjacent chambers, such as 19a and 19b in FIG. 2, are at the same, or are about the same, distance as two consecutive orifices 19 belonging to the same chamber 20, such as 19b and 19c.

In all the examples, it was assumed that there is one feeding passage per equalization chamber. On the other hand, the presence of more than one feeding passage per chamber would not pesent any difficulty in carrying out the invention for the following reasons:

supposing that there are two passages per chamber, it is obvious that they would be symmetrically arranged and then, through the section of the chamber equidistant from the two feeding passages, there would be no flow of material. Such a section would then act like a wall and the chamber of equalization could be considered as consisting of two fictitious symmetrical chambers separated by that section and the instructions of the invention could be applied to each of those fictitious chambers. The same reasoning would be made, if there were more than two passages per chamber, arranged symmetrically.

Even in the case, which is obviously not to be desired, of more feeding passages, which are not symmetrically arranged, for each chamber of equalization, the conditions of the invention could be applied by considering each chamber as consisting of more fictitious chambers separated by those sections through which, in consequence of the arrangement of the feeding passages, no flow of mix would take place and by applying the conditions of the invention to each fictitious chamber.

The length (axial) of the feeding passages is obviously unimportant for the purposes of the invention, those passages being a continuation of remarkably long feeding pipelines. It is advantageous for the length of the injection orifices to be as short as possible in order to reduce the total losses of load.

As a further illustration of the process according to the invention, the basic parameters of examples of the invention are now described, assuming that they are carried out with the devices described above. The examples quoted in the schedule refer to either the manufacture of new tires, and of the type as per FIG. 4 in particular, or the retreading of radial tires of the conventional type.

The chambers of equalization are assumed to be of substantially circular section. Gradients $\gamma$ of the injection orifices are so near as to be able to state one value for all in each example.

On the other hand, it must be kept in mind that, with regard to low values of $\gamma$ (just as they are used in the chambers of equalization according to this invention) percentage changes of same, even considerable, are granted, since such changes do not involve any remarkable changes in the pressure drop in the equalization chambers. On the contrary, should high values of $\gamma$ be used in those chambers (such as those stated for the injection orifices), percentage changes of same, even unimportant, would involve high changes in the pressure drop in the equalization chambers.

Lastly, the invention does not depend on the composition of the mix and can be generally carried out with the mixes already known and used in the technique for manufacturing treads.

As an example, a type of mix, which is well-known and can be used for carrying out the invention, can have the following composition:

| | |
|---|---|
| SBR 1500 | 50 |
| SBR 1712 | 50 |
| Zinc oxide | 1 |
| Sulphur | 1 |
| Antioxidizer | 1 |
| Stearic acid | 2 |
| Paraffin | 1 |
| Aromatic oil | 10 |
| Lampblack N. 339 | 61 |
| Tiazolo accelerator | 3 |

| Example No. | Moony viscosity of the mix mm | Outer diameter of tread mm. mm | No. of equalization chambers | No. of injection orifices | Gradients $\sec^{-1}$ $\gamma_a$ | Gradients passages $\gamma$ | Diameter of feeding orifices | Diameter of injection delivery | delivery gr/sec. |
|---|---|---|---|---|---|---|---|---|---|
| 1 | 68 | 600 | 16 | 64 | 250 | 1500 | 8.0 | 2.75 | 201 |
| 2 | 62 | 500 | 8 | 32 | 180 | 2000 | 7.0 | 1.95 | 48 |
| 3 | 68 | 600 | 16 | 64 | 185 | 1500 | 7.0 | 2.2 | 100 |
| 4 | 68 | 600 | 12 | 60 | 250 | 2175 | 8.8 | 2.5 | 200 |
| 5 | 50 | 600 | 16 | 64 | 500 | 5800 | 5.75 | 1.6 | 150 |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the injection molding of treads on a tire carcass which comprises feeding an elastomeric composition for molding the tire's tread to a plurality of equalization spaces symmetrically arranged with respect to the injection cavity of the mold where the tread is formed, said mix moving to the said injection cavity from each of the said spaces through a plurality of injection passages, said mix being fed to each of the above spaces through at least one feeding passage, the ratio between average sliding gradients $\gamma_i$ of the said injection passages and gradients $\gamma_a$ of the said feeding passages being not lower than 8.

2. The process of claim 1 wherein the ratio between gradients $\gamma$ is between 8 and 20.

3. The process of claim 1 wherein gradients $\gamma$ of the injection passages are substantially equal to one another.

4. The process of claim 1 wherein the equalization spaces are of a substantially annular form.

5. The process of claim 4 wherein the equalization spaces are with a substantially circular section.

6. The process of claim 1 wherein the sections of the equalization spaces and the sections of the feeding passages are substantially equal to one another.

7. The process of claim 1 wherein the injection passages are from 4 to 6 in number per each equalization space.

8. The process of claim 1 wherein the injection passages are evenly spaced from one another on the whole development of the periphery of the mold.

9. The process of claim 1 wherein the sections of the injection passages are substantially equal to one another.

10. The process of claim 1 wherein gradients $\gamma_i$ of the injection passages are between 1500 and 2500 and gradients $\gamma_a$ of the feeding passages are between 150 and 250.

* * * * *